(12) United States Patent
Jaramillo

(10) Patent No.: US 7,930,648 B1
(45) Date of Patent: Apr. 19, 2011

(54) EXPANDED STACK VIEW

(75) Inventor: Narciso B. Jaramillo, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1072 days.

(21) Appl. No.: 11/546,002

(22) Filed: Oct. 10, 2006

(51) Int. Cl.
*G06F 3/00* (2006.01)

(52) U.S. Cl. ........................... 715/790; 715/853

(58) Field of Classification Search ........... 715/790–794
See application file for complete search history.

(56) References Cited

U.S. PATENT DOCUMENTS

| | | | |
|---|---|---|---|
| 5,463,725 A | 10/1995 | Henckel et al. | |
| 5,528,744 A * | 6/1996 | Vaughton | 715/772 |
| 5,689,666 A | 11/1997 | Berquist et al. | |
| 5,828,371 A | 10/1998 | Cline et al. | |
| 5,880,743 A | 3/1999 | Moran et al. | |
| 5,911,145 A | 6/1999 | Arora et al. | |
| 5,917,492 A * | 6/1999 | Bereiter et al. | 715/854 |
| 5,943,053 A | 8/1999 | Ludolph et al. | |
| 5,963,204 A | 10/1999 | Ikeda et al. | |
| 6,002,397 A | 12/1999 | Jaaskelainen, Jr. | |
| 6,014,138 A | 1/2000 | Cain et al. | |
| 6,031,989 A * | 2/2000 | Cordell | 717/109 |
| 6,088,708 A | 7/2000 | Burch et al. | |
| 6,239,798 B1 | 5/2001 | Ludolph et al. | |
| 6,337,698 B1 | 1/2002 | Keely et al. | |
| 6,694,487 B1 | 2/2004 | Ilsar et al. | |
| 6,763,497 B1 * | 7/2004 | Softky | 715/205 |
| 7,076,733 B2 | 7/2006 | Smith | |
| 7,081,882 B2 | 7/2006 | Sowden et al. | |
| 7,113,190 B2 | 9/2006 | Heaton | |
| 7,149,960 B1 * | 12/2006 | Brooks et al. | 715/234 |
| 7,248,269 B2 | 7/2007 | Card et al. | |
| 7,395,525 B2 * | 7/2008 | Softky | 717/125 |
| 7,472,343 B2 * | 12/2008 | Vasey | 715/234 |
| 2002/0140736 A1 | 10/2002 | Chen | |
| 2002/0188632 A1 | 12/2002 | Su | |
| 2003/0043177 A1 | 3/2003 | Kawai | |
| 2003/0071849 A1 * | 4/2003 | Ferri | 345/777 |
| 2003/0160832 A1 * | 8/2003 | Ridgley et al. | 345/854 |
| 2004/0205514 A1 | 10/2004 | Sommerer et al. | |
| 2005/0283734 A1 * | 12/2005 | Santoro et al. | 715/765 |
| 2006/0015804 A1 | 1/2006 | Barton et al. | |

(Continued)

OTHER PUBLICATIONS

Wayback Machine, "W3schools Division Tutorial", http://web.archive.org/web/20030801072752/http://www.w3schools.com/tags/tag_div.asp. Published Aug. 1, 2003, 3 pgs.

(Continued)

*Primary Examiner* — Ryan F Pitaro
(74) *Attorney, Agent, or Firm* — Kilpatrick Stockton LLP

(57) ABSTRACT

A feature for visibly distinguishing multiple containers within an application being edited in an ADE is described. When the user selects to activate the container expansion, the ADE identifies an active target container in the application and then analyzes a container hierarchy based on the target container. The ADE visually represents the container hierarchy in a graphical overlay superimposed on top of the application. The visual representation includes a container proxy for each of the containers within the hierarchy. The container proxies are drawn in a manner to visibly distinguish each of the proxies to the developer even though the actual containers are not distinguishable in the application. The overlay of container proxies are superimposed onto the application in a design view of the ADE and the developer may make changes to the underlying application by interacting with the overlay.

32 Claims, 6 Drawing Sheets

U.S. PATENT DOCUMENTS

| | | | |
|---|---|---|---|
| 2006/0031754 | A1 | 2/2006 | Lehenbauer et al. |
| 2006/0282766 | A1* | 12/2006 | Parsell .................. 715/513 |
| 2007/0162953 | A1 | 7/2007 | Bolliger et al. |
| 2007/0277149 | A1* | 11/2007 | Stevens .................. 717/105 |
| 2008/0016472 | A1* | 1/2008 | Rohlf et al. .................. 715/848 |
| 2008/0270933 | A1* | 10/2008 | Straw et al. .................. 715/781 |
| 2009/0031247 | A1* | 1/2009 | Walter et al. .................. 715/788 |

OTHER PUBLICATIONS

Wayback Machine, "W3schools CSS Margin Tutorial", http://web.archive.org/web/20031210134241/http://www.w3schools.com/css/css_margin.asp. Published Dec. 10, 2003, 3 pgs.

Wayback Machine, "W3schools CSS Border Tutorial", http;//web.archive.org/web/20031204195615/http://www.w3schools.com/css/css_border.asp. Published Dec. 4, 2003, 7 pgs.

U.S. Appl. No. 10/927,963, filed Aug. 27, 2004, Victor Mitnick et al.

U.S. Appl. No. 11/175,114, filed Jul. 5, 2005, Dexter Reid et al.

Final Office Action mailed Nov. 9, 2009 in related U.S. Appl. No. 10/927,963.

Final Office Action mailed Dec. 4, 2009 in related U.S. Appl. No. 11/174,114.

Advisory Action mailed Mar. 4, 2010 in related U.S. Appl. No. 11/175,114.

Interview Summary dated Feb. 11, 2009 in related U.S. Appl. No. 10/927,963.

Office Action dated Apr. 14, 2009 in related U.S. Appl. No. 10/927,963.

Office Action dated Dec. 8, 2008 in related U.S. Appl. No. 10/927,963.

Office Action dated Jun. 5, 2008 in related U.S. Appl. No. 10/927,963.

Interview Summary dated Mar. 11, 2008 in related U.S. Appl. No. 10/927,963.

Office Action dated Jan. 2, 2008 in related U.S. Appl. No. 10/927,963.

Office Action dated Aug. 15, 2007 in related U.S. Appl. No. 10/927,963.

Office Action dated Apr. 28, 2009 in related U.S. Appl. No. 11/174,114.

Interview Summary dated Jan. 7, 2009 in related U.S. Appl. No. 11/174,114.

Office Action dated Oct. 3, 2008 in related U.S. Appl. No. 11/175,114.

Interview Summary dated Aug. 18, 2008 in related U.S. Appl. No. 11/175,114.

Office Action dated Apr. 17, 2008 in related U.S. Appl. No. 11/175,114.

Office Action dated Oct. 9, 2007 in related U.S. Appl. No. 11/175,114.

Examiner's Answer mailed Jul. 12, 2010 in related U.S. Appl. No. 10/927,963.

Office Action mailed Jul. 23, 2010 in U.S. Appl. No. 11/175,114.

Cox, Joyce and Preppernau, Joan, Microsoft(R) Office Specialist Study Guide—Office 2003 Edition, published by Microsoft Press on Jun. 23, 2004, pp. 130-132, 638-639 as retrieved Jul. 3, 2010 from Safari Books Online at http://proquest.safaribooksonline.com/0735621101.

* cited by examiner

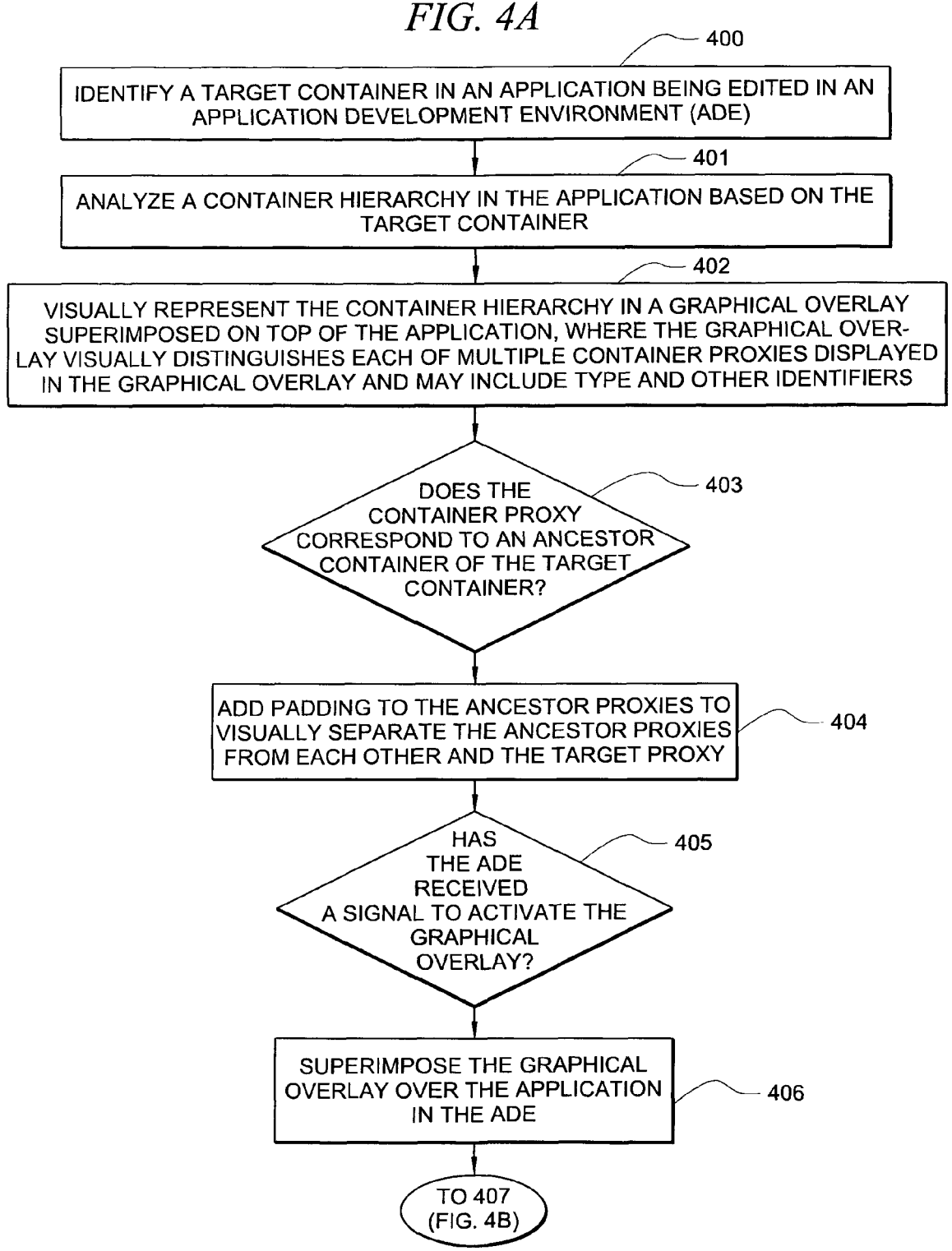

EXPANDED STACK VIEW

CROSS-REFERENCE TO RELATED APPLICATIONS

The present application is related to concurrently filed, and commonly assigned U.S. patent application Ser. No. 10/927, 963, entitled "EXPANDED CONTAINER VIEW FOR GRAPHICAL EDITING ENVIRONMENT"; and U.S. patent application Ser. No. 11/175,114, entitled "LOCALIZED EXPLODED VIEW", the disclosures of which are hereby incorporated herein by reference.

TECHNICAL FIELD

The present invention relates, in general, to application development environments (ADEs) and, more specifically, to graphical user interface (GUI) tools for ADEs.

BACKGROUND

Application development environments (ADEs) are software tools that allow a developer (e.g., a web developer, application developer, and the like) to create web pages, websites, interactive applications, and the like for use by end users (e.g., visitors to websites, application uses, and the like). Various ADEs exist in the current marketplace, such as DREAMWEAVER®, GOLIVE®, FLEX™, and FLEX BUILDER™ each available from Adobe Systems Incorporated of San Jose, Calif. DREAMWEAVER® and GOLIVE® are ADEs that allow web developers to design Hypertext Markup Language (HTML) web pages in both a code editor and a graphical-based design time environment. DREAMWEAVER® also allows the developer to design in other languages, such as, for example, ASP, CFML™, and the like. FLEX™ is a presentation layer technology that has an ADE, FLEX BUILDER™, associated with it for creating Rich Internet Applications (RIAs), which are interactive, multimedia, applications, that may run on client-side players or within client-side process containers, for example, Adobe System Incorporated's FLASH® player. FLEX™ and FLEX BUILDER™ utilize Adobe Systems Incorporated's MXML™, an Extensible Markup Language (XML)-based language, to describe RIAs. Much of a developer's job, whether creating a simple web page, a complex web application, or a RIA, is to create user interfaces (UIs) for the applications that are easy to use and enhance a user's experience.

The interface screens defined with HTML, MXML™, and the like often include container objects or constructs, which are structural elements that hold additional visual objects that are rendered in the resulting interface screens. In other words, a container may be considered a visual organizational unit for automatically laying out the visual elements of a UI. Thus, while an end user usually will not see the actual container objects or constructs in the application, the containers are present, organizing and laying out the visual elements. In an MXML™-enabled ADE, example container constructs include an HBox, VBox, form, form item, panel, tile, grid, grid row or item, title window, control bar, HDividedBox, VDividedBox, application, and the like. In HTML, containers take the form of tables, divisions (DIVs), and the like. Each of these constructs define containers which, for example, position content horizontally (e.g., an HBox) and/or vertically (e.g., a VBox), or simply hold visual objects at some position within the visual page (e.g., table, DIV).

The complex designs of modern web pages and graphics-driven applications often use various nested containers and stacked containers within the UI, in order to create the desired visual experience. However, nesting multiple containers in a UI may cause problems for developers during creation or modification of the UI. For example, a UI under development may have a horizontal box to lay objects out horizontally and one or more vertical boxes, nested within the horizontal box to lay objects out vertically. The problem arises when the various nested containers share edges with each other. For example, the left edge of a VBox that is inside an HBox could be the same as the left edge of the HBox containing that VBox. If the developer desires to insert another VBox between the current left-most VBox and the containing HBox, the shared edge will make it extremely difficult, if not impossible, to access to the virtual space between the existing boxes. To the developer, there would not appear to be any space into which he or she may drag and drop another desired object. Therefore, in order for the developer to place or move an object, he or she would typically move one of the overlapped boxes to physically create a space into which the other object may be placed. This extra step is seriously inconvenient to a developer.

BRIEF SUMMARY

Various representative embodiments of the present invention relate to systems, methods, and computer program products for visibly distinguishing multiple containers within an application being edited in an ADE. When the user selects to activate the container expansion, the ADE identifies an active target container in the application and then analyzes a container hierarchy based on the target container. The ADE visually represents the container hierarchy in a graphical overlay superimposed on top of the application. The visual representation includes a container proxy for each of the containers within the hierarchy. The container proxies are drawn in a manner to visibly distinguish each of the proxies to the developer even though the actual containers are not distinguishable in the application. The overlay of container proxies are superimposed onto the application in a design view of the ADE.

A developer may edit the underlying application by interacting with the target container proxy in the overlay. The target container proxy corresponds to the target container in the application. The developer may move containers around within the target proxy or insert any object in the target container. The developer may also change which container proxy is the target container. The developer may do this in a variety of ways, such as simply providing a mouse click in the desired container proxy, hovering over the desired proxy, hovering over the desired proxy in addition to activating a hot key, or some other action. With the selection of a new target proxy, the ADE re-analyzes the container hierarchy and then updates the overlay. The updated overlay may add, delete, or change the size of containers, depending on the container hierarchy of the target proxy. The ability to edit the application by interacting with the target container proxy in the overlay, and then changing the target proxy, allows the developer to have a great amount of control over the makeup of the application, while increasing the precision with which the developer may interact with various overlapping, stacked, and adjacent containers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

In order to address the problems encountered with nested or overlapped containers, additional technology has been developed which is described in commonly-owned, U.S. patent application Ser. No. 10/927,963, entitled "EXPANDED CONTAINER VIEW FOR GRAPHICAL EDITING ENVIRONMENT," and U.S. patent application Ser. No. 11/175,114, entitled "LOCALIZED EXPLODED VIEW," the disclosures of which are incorporated by reference herein for all purposes.

Figure 1A:
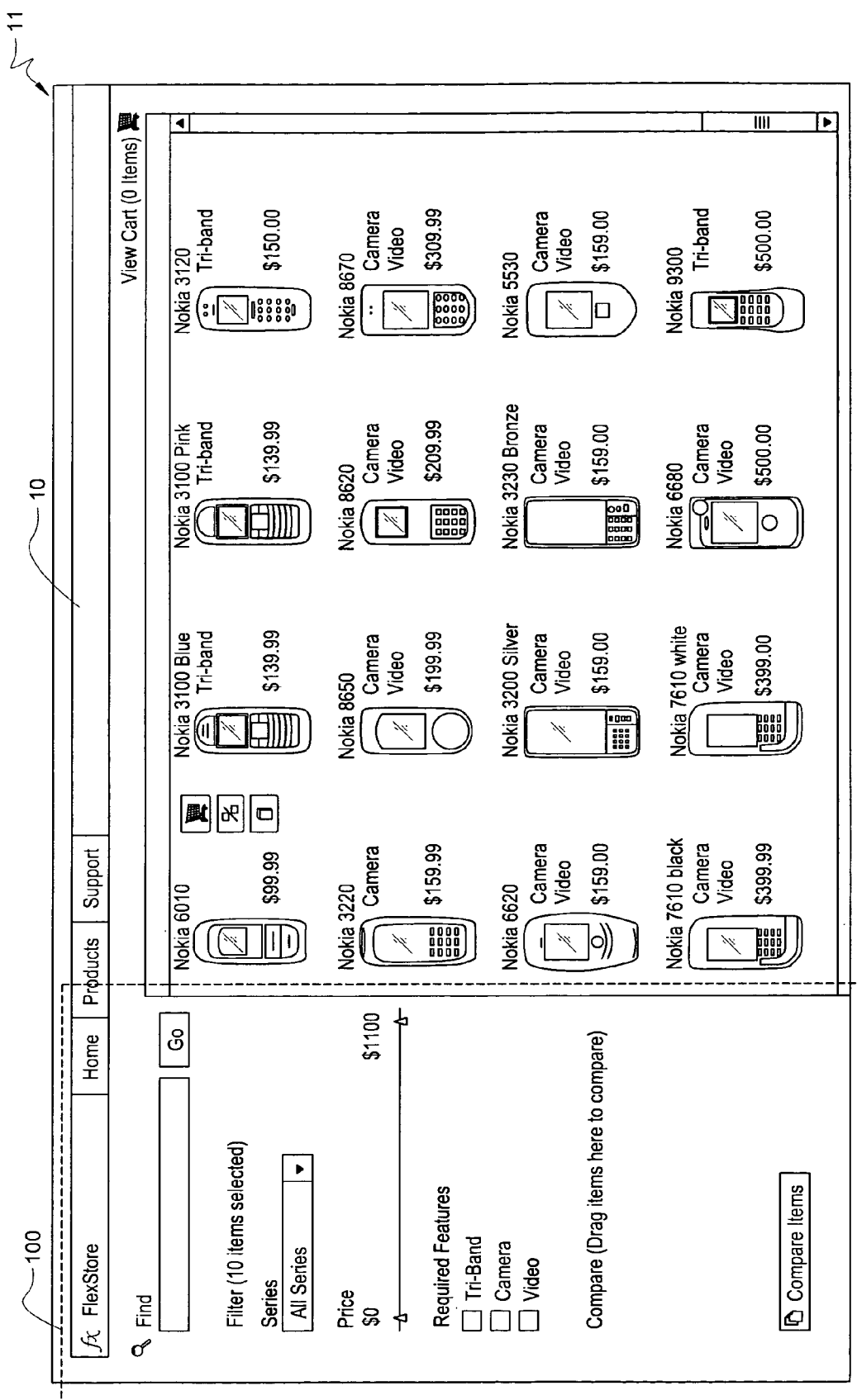
FIG. 1A is a screenshot illustrating a web document in a development environment configured according to one embodiment of the present invention.

FIG. 1A is a screenshot illustrating web document 10 in a development environment, ADE 11, configured according to one embodiment of the present invention. Although the appearance of web document 10 appears to be seamless and smooth, the underlying structural elements include various containers that define the look of web document 10. For example, control area 100 includes various components and controls for interacting with an end user. In the What You See Is What You Get (WYSIWYG) view of web document 10, each of the components and controls appear seamlessly placed on control area 100. In building control area 100, however, the developer used several different nested containers to position the components and controls in precise locations within control area 100.

Figure 1B:
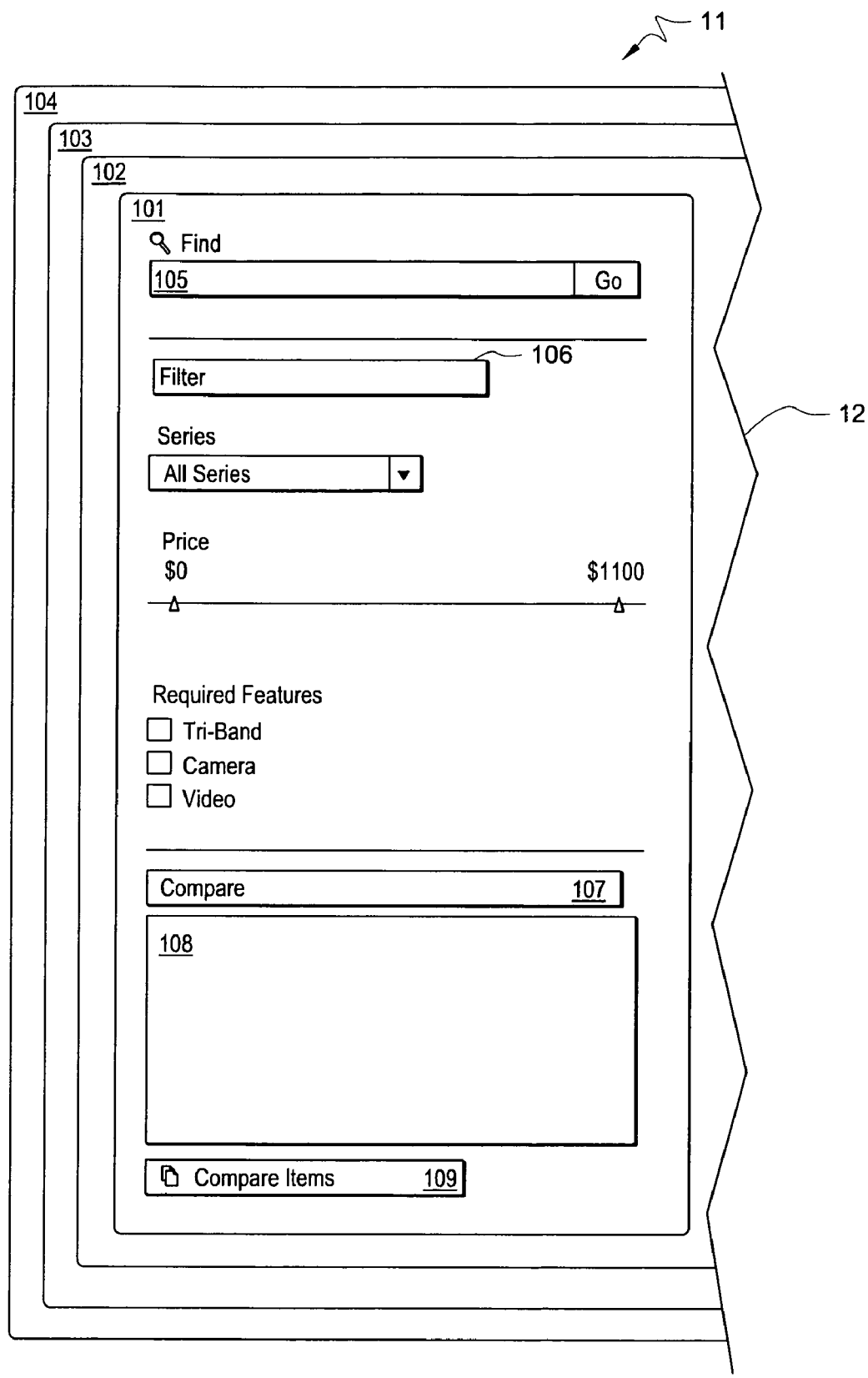
FIG. 1B is a screenshot illustrating a partial view of an ADE configured according to one embodiment of the present invention.

FIG. 1B is a screenshot illustrating a partial view of ADE 11 configured according to one embodiment of the present invention. The developer enables container overlay mode, which renders overlay 12 on top of web document 10 (FIG. 1A). Overlay 12 provides a visual reference of the container hierarchy of control area 100 (FIG. 1A). Target container proxy 101 is the selected container proxy within overlay 12. As the selected container proxy, target container proxy 101 is rendered to be shaded, yet translucent, so that the developer can see the underlying components of control area 100 (FIG. 1A). Container overlay mode provides visual proxy reference of the target container, each of the ancestor containers of the target container, and each immediate child container in the target container. Thus, overlay 12 includes target container proxy 101, each of the immediate child containers of target container proxy 101 (i.e., child container proxies 105-109), and each ancestor container of target container proxy 101 (i.e., ancestor container proxies 102-104). Each of child container proxies 105-109 and ancestor container proxies 102-104 are rendered with a higher alpha channel translucency than target container proxy 101. As the alpha channel level increases, the level of translucency decreases, thus, visually distinguishing target container proxy 101 from all of the other container proxies rendered in overlay 12. Moreover, in order to further distinguish ancestor container proxies 102-104 from target container proxy 101, padding is added to each of ancestor container proxies 102-104 to expand their representations in overlay 12. In this manner, even if various containers overlap and share edges, overlay 12 displays each container representation to be visibly distinguishable from another container. In contrast, the child container proxies within the target container proxy are not padded or moved.

It should be noted that in additional and/or alternative embodiments of the present invention, web document 10 may be coded using various computer languages. For example, if coded in HTML, the container proxies illustrated in overlay 12 may represent divisions, tables, and the like. If coded in MXML™, the container proxies illustrated in overlay 12 may represent HBoxes, VBoxes, panels, and the like. The various embodiments of the present invention are not limited to a single computer language implementation.

It should further be noted that in additional and/or alternative embodiments of the present invention, the heuristics used to select which particular containers are shown may be modified to fit the particular purpose of the application. As such, instead of limiting the child containers shown to be the immediate children, as noted above, all children of a target container may be shown. In this type of embodiment, there may need to be padding added to the child containers to visually distinguish the immediate children from the grandchildren. In the embodiment described in FIG. 1B, no padding is necessary on the immediate child containers, which lessens the cluttered look of the target container.

Figure 2:
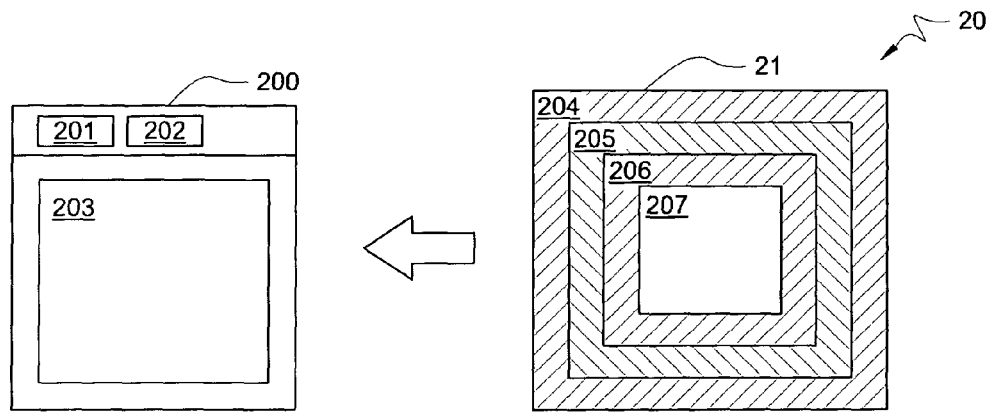
FIG. 2 is a block diagram illustrating an overlay system configured according to one embodiment of the present invention.

FIG. 2 is a block diagram illustrating overlay system 20 configured according to one embodiment of the present invention. The mechanics of overlay system 20 are performed by an ADE. As the developer creates web documents or elements, such as window 200 containing buttons 201 and 202 and text field 203, he or she may select to enable the container overlay mode in order to more-distinctly visualize the different containers defining window 200. Once the developer enables the container overlay mode, the ADE generates the graphics that make up overlay 21. Overlay 21 is drawn by the ADE to include ancestor container proxies 204-206 (each with added padding to separate them), with container proxy 207 being rendered as the target container proxy. The ADE then superimposes the graphics of overlay 21 on top of window 200 in the design view window of the ADE. The developer, thus, sees overlay 21 and the distinctions between the various containers that it illustrates.

The developer may also interact with and edit window 200 by interacting with overlay 21. The developer can drag a component, object, container, or the like onto target container proxy 207 and cause that component, object, container, or the like to be added to corresponding container in window 200 within the design view window of the ADE. Furthermore, if target container proxy 207 includes its own embedded containers, the developer may drag those containers and re-embed them onto one of the other container proxies, ancestor container proxies 204-206. Because the container representations rendered in overlay 21 do not include a representation of any objects, components, or controls, the developer is not allowed to manipulate any of those items that are already embedded in the container through overlay 21. Again, the manipulation of the embedded containers in target container proxy 207 causes the corresponding action to occur in the corresponding container in design view window of the ADE.

When dragging an item onto overlay 21, the developer can change the target container proxy from target container proxy 207 to any other of ancestor container proxies 204-206 by hovering his or her cursor over the overlay representation of the desired container. When ADE detects that hovering has occurred for a specific time, it changes the target container proxy to that proxy, and redraws overlay 21 to reflect the change. For example, if the developer hovers his or her cursor over ancestor container proxy 205 while dragging an item, the ADE would re-draw overlay 21 to make ancestor container proxy 205 more translucent and reduce its size to its size in window 200 to represent its new status as the target container proxy. Container proxy 206 would also reduce its size to match its actual size in window 200 since container proxy 206 is the immediate child of new target container proxy 207. Additionally, container proxy 207 would disappear from overlay 21 because it is not an immediate child of new target container proxy 205. Instead of effecting these changes instantly, an animation may be used to smoothly transition each of the container proxies to their new positions and sizes, while removing the container proxies that are no longer required on the overlay. Because the interaction with overlay 21 also affects the related container in the design view window, the ADE changes the selected container also in the design view window.

Making different selections of the various containers in overlay 21 may have an effect on how it is displayed to the developer. The target containers and their immediate children are generally represented by overlay proxies that are the same size as the underlying container. However, the ancestor container proxies add padding to visually separate themselves from each other and from the target proxy. When an ancestor container proxy is selected to become the new target proxy, the transition may cause some container proxies to disappear, such as perhaps the immediate children of the current target container, and may cause some container proxies to appear, such as a sibling of the previous target container, if that container is an immediate child of the new target proxy. Further, the target proxy may be reduced in size since some of its descendants (i.e., the children of the original target proxy) are no longer being shown. Thus, as the selected proxy container transitions from an ancestor proxy to the target proxy, it will reduce in size by dropping the previously added padding. Selecting a child as a new target proxy adds other possible changes to the overlay. When the child is selected, each ancestor will expand in size with the added padding, while the child target proxy may expand slightly to show its immediate children. Therefore, the algorithm for determining which containers to display and how to display them may cause a great deal of changes in the overlay from selection to selection.

It should be noted that in additional and/or alternative embodiments of the present invention, an animation may be added to smooth the transitioning effects between the selections of different container proxies as the target proxy. If the changes to size, appearance or disappearance of container proxies happens in an immediate display change, a user may become confused as to what just happened. By adding an animation that smoothly shows the transitions in size, position, newly added or deleted containers, and the like, a user is more likely to visual perceive the exact changes taking place.

Figure 3A:
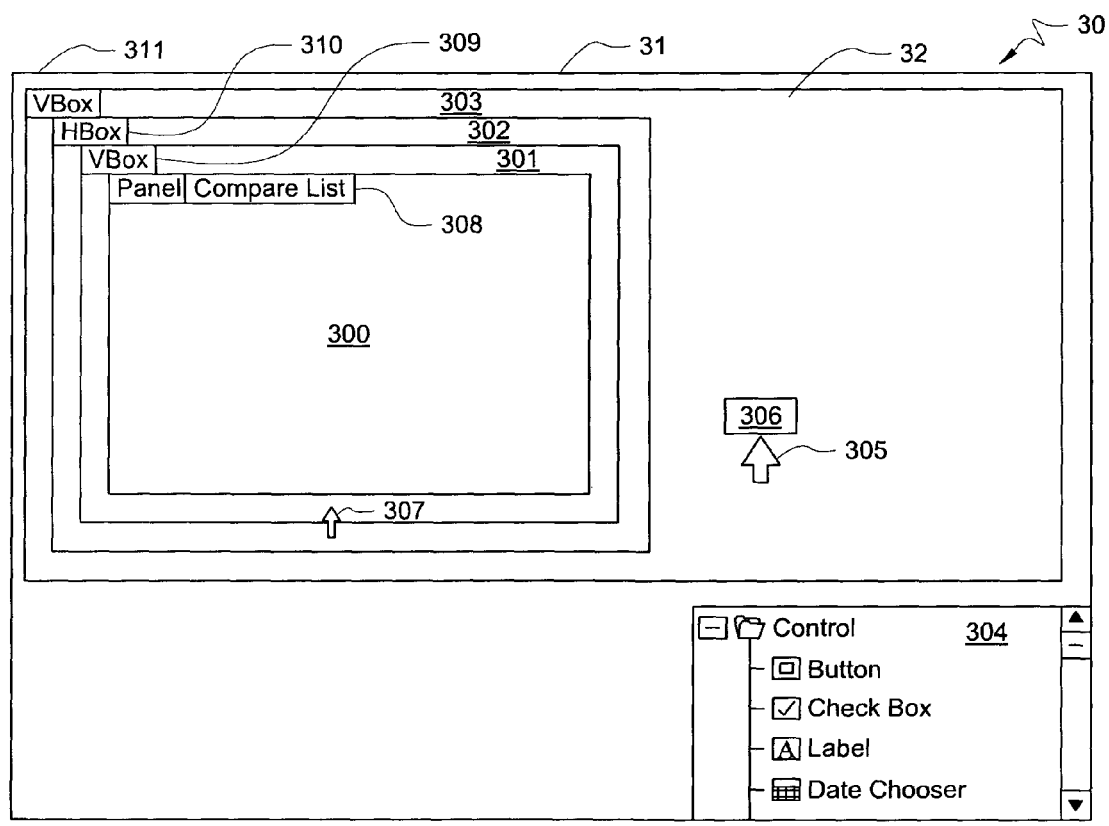
FIG. 3A is a screenshot illustrating an ADE configured according to one embodiment of the present invention.

FIG. 3A is a screenshot illustrating ADE 30 configured according to one embodiment of the present invention. Web application 31 is illustrated in ADE 30 with overlay 32 superimposed over it. The container overlay mode in ADE 30 may be activated either by selecting a button, menu, function key, or the like, or may be automatically enabled when the developer begins dragging an item onto the design view window. In the illustrated embodiment, the developer selects button control 306 from component panel 304 and begins dragging it onto the design view window of ADE 30 with cursor 305. In response to the dragging, overlay 32 is rendered on top of web application 31 illustrating the container hierarchy. Overlay 32 includes target container proxy 300 and ancestor container proxies 301-303. As an additional aid to the developer ADE 30 also includes labels on the rendered container proxies in overlay 32. Thus, target container proxy 300 includes panel label 308 (which also includes its ID "CompareList"), ancestor container proxy 301 includes VBox label 309, ancestor container proxy 302 includes HBox label 310, and ancestor container proxy 303 includes VBox label 311. By providing the type labels and including any IDs associated with the particular container proxy instances, the developer is given much more information about the containers at issue, which is beneficial for the developer to maintain the overall organization of web application 31.

The developer working with web application 31 desires to drop button control 306 onto ancestor container proxy 301. Therefore, to change the target container proxy to ancestor container proxy 301, the developer would continue dragging button control 306 over to the point at arrow 307. By hovering cursor 305 at arrow 307 for a certain amount of time, ADE 30 changes the target container proxy from target container proxy 300 to ancestor container proxy 301.

Figure 3B:
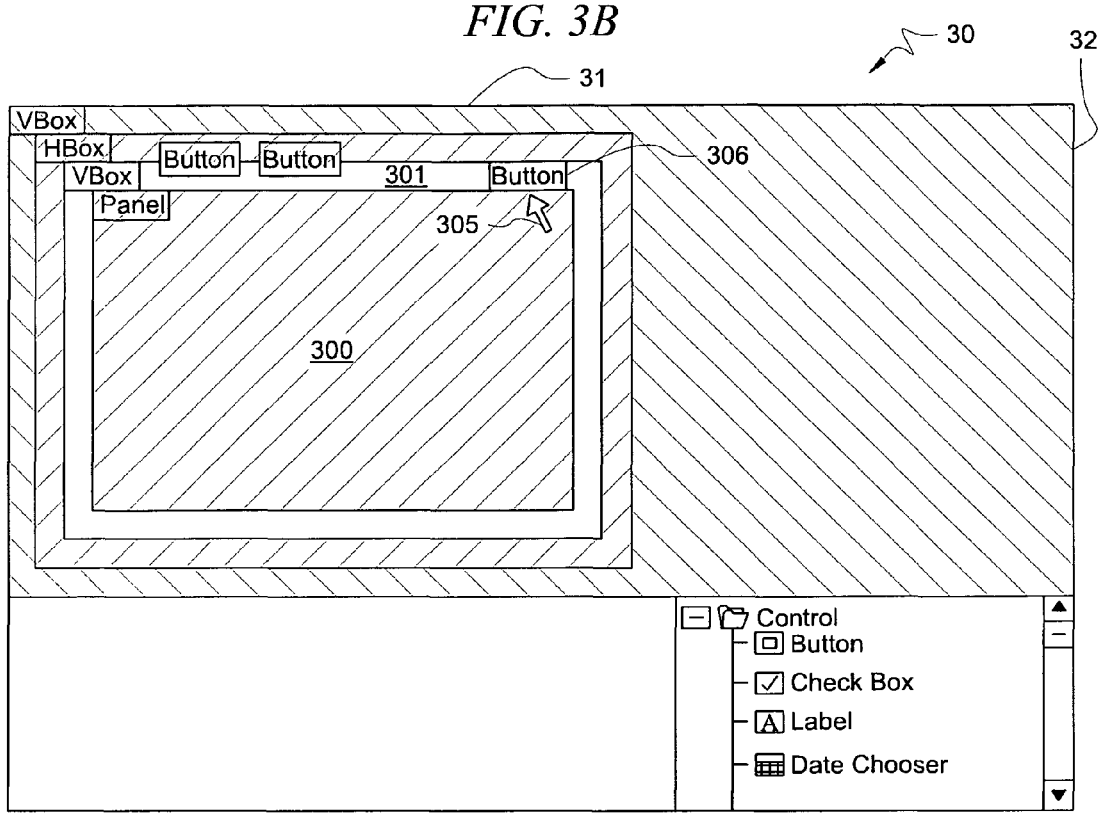
FIG. 3B is a screenshot illustrating an ADE configured according to one embodiment of the present invention.

FIG. 3B is a screenshot illustrating ADE 30 configured according to one embodiment of the present invention. Once ADE 30 changes the target container proxy to ancestor container proxy 301, overlay 32 is redrawn to make ancestor container proxy 301 more translucent to reflect its new status as the target container proxy and makes target container proxy 300 less translucent to reflect its new status of a child container proxy of ancestor container proxy 301. The developer may now drag button control 306 to its insertion point on ancestor container proxy 301 using cursor 305. Once button control 306 is dropped onto its insertion point, ADE 30 reads the location of button control 306 on overlay 32 and inserts a button control onto the corresponding container in web application 31.

Figure 4B:
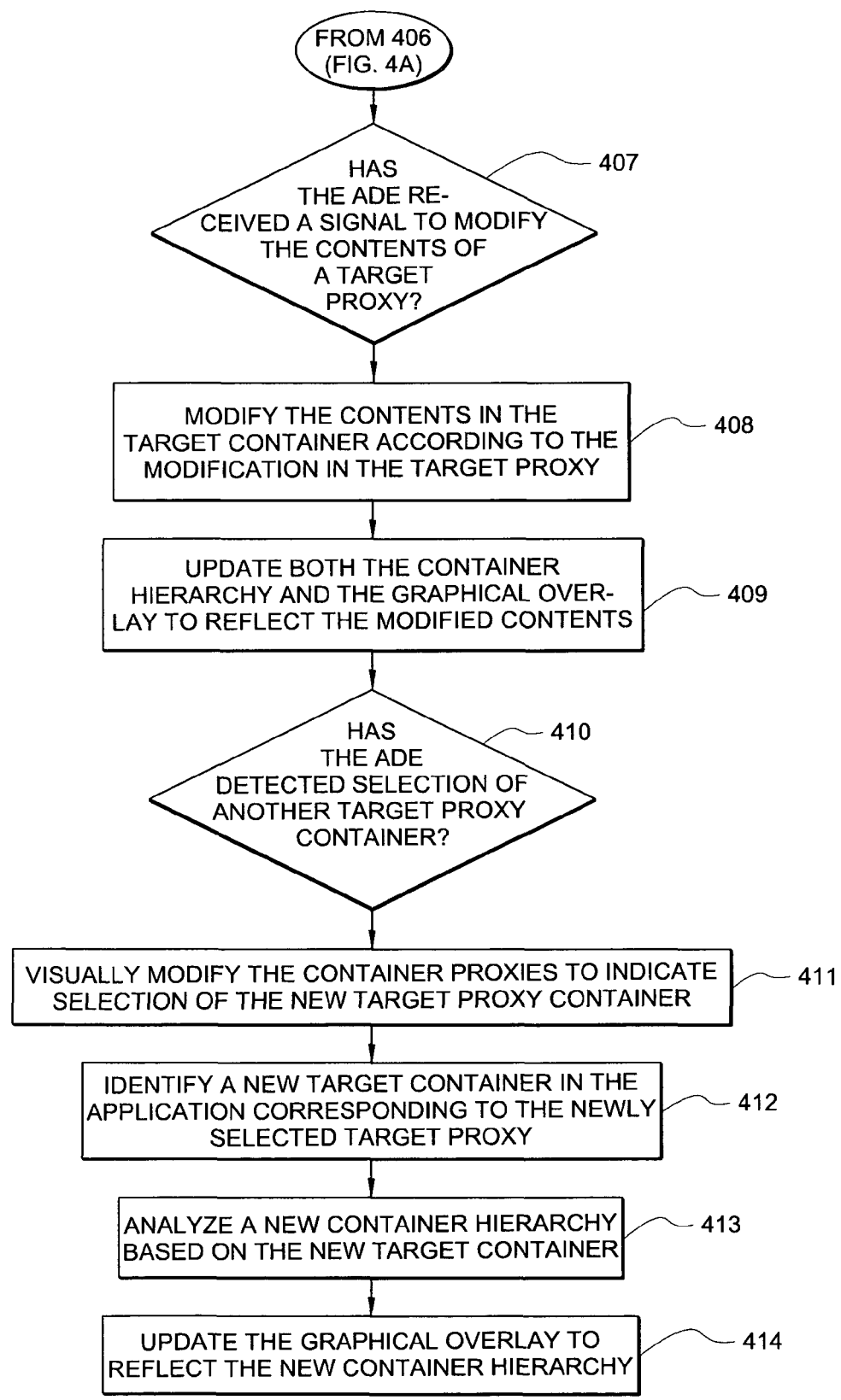
FIG. 4 is a flowchart illustrating example steps executed to implement one embodiment of the present invention.

FIG. 4 is a flowchart illustrating example steps executed to implement one embodiment of the present invention. In step 400, a target container is identified in an application being edited in an application development environment (ADE). The ADE analyzes a container hierarchy in the application based on the target container in step 401. The container hierarchy is visually represented in a graphical overlay superimposed on top of the application, in step 402, where the graphical overlay visually distinguishes each of multiple container proxies displayed in the graphical overlay and may include type and other identifiers. A determination is made, in step 403, whether the container proxy corresponds to an ancestor container of the target container. If so, padding is added, in step 404, to the ancestor proxies to visually separate the ancestor proxies from each other and the target proxy. A determination is made, in step 405, whether the ADE has received a signal to activate the graphical overlay. If so, the graphical overlay is superimposed, in step 406, over the application in the ADE. A determination is made, in step 407, whether the ADE received a signal to modify the contents of a target proxy. If so, the contents in the target container are modified, in step 408, according to the modification in the target proxy. Both the container hierarchy and the graphical overlay are updated, in step 409, to reflect the modified contents. A determination is made, in step 410, whether the ADE has detected selection of another target proxy container. If so, the container proxies are visually modified, in step 411, to indicate selection of the new target proxy container. A new target container is identified in the application, in step 412, corresponding to the newly selected target proxy. A new container hierarchy is analyzed, in step 413, based on the new target container. The graphical overlay is updated, in step 414, to reflect the new container hierarchy.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 5:
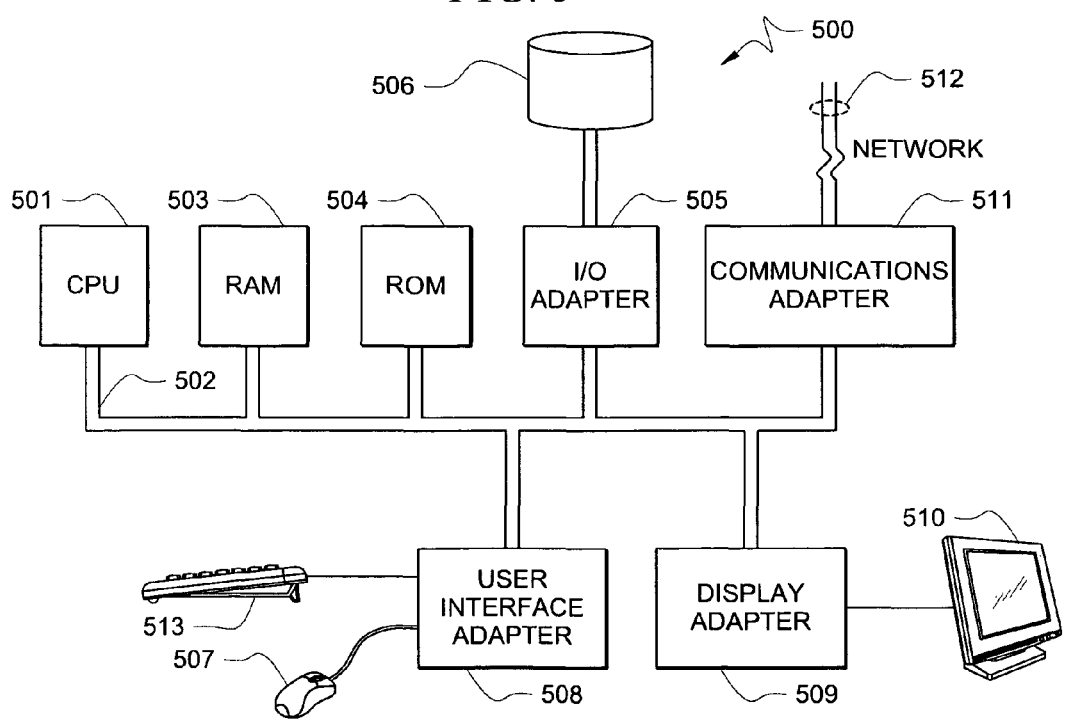
FIG. 5 illustrates a computer system adapted to use embodiments of the present invention.

FIG. 5 illustrates computer system 500 adapted to use embodiments of the present invention, e.g. storing and/or executing software associated with the embodiments. Central processing unit (CPU) 501 is coupled to system bus 502. The CPU 501 may be any general purpose CPU. However, embodiments of the present invention are not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O adapter card 505 connects storage devices 506, such as one or more of a hard drive, a CD drive, a floppy disk drive, a tape drive, to computer system 500. The I/O adapter 505 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 511 is adapted to couple the computer system 500 to a network 512, which may be one or more of a telephone network, a local (LAN) and/or a wide-area (WAN) network, an Ethernet network, and/or the Internet network. User interface card 508 couples user input devices, such as keyboard 513, pointing device 507, and the like, to the computer system 500. The display card 509 is driven by CPU 501 to control the display on display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
   displaying, in an application development environment, a plurality of containers of an application under development;
   identifying a target container in the application based on a selection action received using the application development environment;
   after receiving the selection action, analyzing a position of the target container in a container hierarchy of said application; and
   visually representing said container hierarchy in a graphical overlay superimposed on top of said application as displayed in the application development environment, wherein said graphical overlay visually distinguishes the target container by displaying a plurality of container proxies, the proxies corresponding to containers in the container hierarchy and including a target proxy corresponding to the target container.

2. The method of claim 1, further comprising:
   receiving a signal to insert an object into the target proxy;
   responsive to said receiving, inserting said object into said target container; and
   updating said container hierarchy and said graphical overlay.

3. The method of claim 1, further comprising:
   receiving a signal to modify a child proxy corresponding to a child member of said container hierarchy;
   responsive to said receiving, modifying the container corresponding to the child proxy; and
   updating said container hierarchy and said graphical overlay.

4. The method of claim 3, wherein the child proxy comprises an immediate child member of said container hierarchy.

5. The method of claim 1, further comprising:
   detecting selection of another proxy container from said container proxies, wherein said another proxy container does not correspond to said target container;
   responsive to said detecting, visually modifying said container proxies to indicate selection of said another proxy container;

identifying a new target container in said application, wherein said new target container corresponds to said another proxy container; and analyzing a new container hierarchy based on said new target container; and updating said graphical overlay to reflect said new container hierarchy.

6. The method of claim 5, further comprising:
animating said updating said graphical overlay, wherein each update to said graphical overlay is smoothly transitioned from a starting point of said update to an end point of said update.

7. The method of claim 5, wherein said detecting selection comprises one of:
detecting a mouse click within an exposed area of said another proxy container;
detecting a cursor hovering over said exposed area for a predetermined length of time; or
detecting selection of a hot key while said cursor is located over said exposed area.

8. The method of claim 1, further comprising:
receiving a signal to modify contents of the target proxy;
responsive to said receiving, modifying said contents in said target container according to said signal; and
updating said container hierarchy and said graphical overlay to reflect said modified contents.

9. The method of claim 1, wherein said visually representing includes:
rendering the target proxy with greater translucency than others of said container proxies; and
inserting padding in one or more ancestor proxies, wherein said one or more ancestor proxies correspond to one or more ancestor members of said container hierarchy, and wherein said padding visually separates each of said one or more ancestor proxies from one another and from said target proxy.

10. The method of claim 1, further comprising:
inserting a label on each of said container proxies, wherein said label identifies one or more of:
a type of container corresponding to said each of said container proxies; or
an ID associated with said container corresponding to said each of said container proxies.

11. A method comprising:
identifying a target container in an application interface;
determining one or more ancestor containers of said target container;
rendering a target container proxy in an overlay superimposed on top of said application interface in a design view of an application development environment (ADE), wherein said target container proxy corresponds to said target container;
rendering one or more ancestor container proxies in said overlay corresponding to said one or more ancestor containers, wherein said one or more ancestor container proxies are rendered to be visually separated from each other and visually distinct from said target container proxy; and
rendering one or more child container proxies corresponding to one or more child containers located within said target container, wherein said one or more child container proxies are rendered to be visually distinct from said target container proxy.

12. The method of claim 11 wherein said one or more child container proxies correspond to one or more immediate child containers located within said target container.

13. The method of claim 11 further comprising:
receiving a signal to modify contents of a target container proxy;
responsive to said receiving, modifying said contents in said target container according to said signal; and
updating said graphical overlay to reflect said modified contents.

14. The method of claim 11 further comprising:
detecting selection of a new target proxy from one of:
one of said one or more ancestor container proxies; and
one of said one or more child container proxies;
responsive to said detecting, visually modifying said overlay to indicate selection of said new target proxy;
identifying a new target container in said application, wherein said new target container corresponds to said new target proxy; and
updating said graphical overlay to reflect said one or more ancestor containers and said one or more child containers related to said new target proxy.

15. The method of claim 14 further comprising:
animating each update to said graphical overlay to reflect a smooth transition between a beginning point to an updated point.

16. The method of claim 11 wherein said detecting selection comprises one of:
detecting a mouse click within an exposed area of said new target proxy;
detecting a cursor hovering over said exposed area for a predetermined length of time; or
detecting selection of a hot key while said cursor is located over said exposed area.

17. The method of claim 11 wherein said overlay is superimposed on said application in response to one or more of:
detecting activation of a selection indicator;
detecting a drag operation; and
detecting selection of a hot key during said drag operation.

18. The method of claim 11 further comprising:
inserting a label on each of said target proxy container, said one or more ancestor container proxies, and said one or more child containers, wherein each said label identifies one or more of:
a type of container; and
an ID associated with each corresponding one of said target proxy container, said one or more ancestor container proxies, and said one or more child containers.

19. A computing system comprising a processor and memory, the memory embodying program components that configure the computing system to:
display an interface of an application under development in a design view, the interface comprising a plurality of containers in a hierarchy, the interface including at least one container nested within an ancestor container;
determine a selection action identifying a target container in the plurality of containers; and
in response to the selection action, display an overlay on the interface as displayed in the design view, the overlay comprising a plurality of container proxies comprising a target container proxy,
wherein the target container proxy is displayed within an ancestor container proxy in the overlay, and
wherein the target container proxy is displayed with a higher translucency than the ancestor container proxy.

20. The system set forth in claim 19, wherein the computing system is further configured to add padding between the target container proxy and the ancestor container proxy in the overlay, the padding between the target container proxy and the ancestor container proxy greater than padding (if any) between the target container and the ancestor container in the interface.

21. The system set forth in claim 19, wherein the computing system is further configured to:
   determine a second selection action identifying a second target container; and
   in response, display a new overlay comprising an ancestor container proxy and a target container proxy, the target container proxy of the new overlay corresponding to the second target container,
   wherein the new overlay is displayed independently of any change in the display of the containers in the interface.

22. The system set forth in claim 19, wherein the selection action comprises at least one of hovering over a container, a command to display an overlay, or hovering over a container proxy in a previously-generated overlay.

23. A computer program product comprising a non-transitory storage medium embodying program code, the program code comprising:
   program code for displaying, in an application development environment, a plurality of containers of an application under development;
   program code for identifying a target container in the application based on a selection action received using the application development environment;
   program code for analyzing a position of the target container in a container hierarchy of said application after receiving the selection action; and
   program code for visually representing said container hierarchy in a graphical overlay superimposed on top of said application as displayed in the application development environment, wherein said graphical overlay visually distinguishes the target container by displaying a plurality of container proxies, the proxies corresponding to containers in the container hierarchy and including a target proxy corresponding to the target container.

24. The computer program product set forth in claim 23, further comprising:
   program code for receiving a signal to insert an object into the target proxy;
   program code, responsive to said receiving, for inserting said object into said target container; and
   program code for updating said container hierarchy and said graphical overlay.

25. The computer program product set forth in claim 23, further comprising:
   program code for receiving a signal to modify a child proxy corresponding to a child member of said container hierarchy;
   program code, responsive to said receiving, for modifying the container corresponding to the child proxy; and
   program code for updating said container hierarchy and said graphical overlay.

26. The computer program product set forth in claim 25, wherein the child proxy comprises an immediate child member of said container hierarchy.

27. The computer program product set forth in claim 23, further comprising:
   program code for detecting selection of another proxy container from said container proxies, wherein said another proxy container does not correspond to said target container;
   program code, responsive to said detecting, for visually modifying said container proxies to indicate selection of said another proxy container;
   program code for identifying a new target container in said application, wherein said new target container corresponds to said another proxy container;
   program code for analyzing a new container hierarchy based on said new target container; and
   program code for updating said graphical overlay to reflect said new container hierarchy.

28. The computer program product set forth in claim 27, further comprising:
   program code for animating said updating said graphical overlay, wherein each update to said graphical overlay is smoothly transitioned from a starting point of said update to an end point of said update.

29. The computer program product set forth in claim 27, wherein said detecting selection comprises one of:
   detecting a mouse click within an exposed area of said another proxy container;
   detecting a cursor hovering over said exposed area for a predetermined length of time; or
   detecting selection of a hot key while said cursor is located over said exposed area.

30. The computer program product set forth in claim 23, further comprising:
   program code for receiving a signal to modify contents of the target proxy;
   program code, responsive to said receiving, for modifying said contents in said target container according to said signal; and
   program code for updating said container hierarchy and said graphical overlay to reflect said modified contents.

31. The computer program product set forth in claim 23, wherein said visually representing includes:
   rendering the target proxy with greater translucency than others of said container proxies; and
   inserting padding in one or more ancestor proxies, wherein said one or more ancestor proxies correspond to one or more ancestor members of said container hierarchy, and wherein said padding visually separates each of said one or more ancestor proxies from one another and from said target proxy.

32. The computer program product set forth in claim 23, further comprising:
   program code for inserting a label on each of said container proxies, wherein said label identifies one or more of:
   a type of container corresponding to said each of said container proxies; or
   an ID associated with said container corresponding to said each of said container proxies.

* * * * *